United States Patent
Ooka (10) Patent No.: US 6,905,011 B2
(45) Date of Patent: Jun. 14, 2005

(54) TRANSMISSION GEAR WITH DOG CLUTCH GEAR AND METHOD FOR MANUFACTURING THE SAME

(75) Inventor: Junichi Ooka, Nagoya (JP)

(73) Assignee: O-Oka Corporation, Nagoya (JP)

(*) Notice: Subject to any disclaimer, the term of this patent is extended or adjusted under 35 U.S.C. 154(b) by 0 days.

(21) Appl. No.: 10/618,611

(22) Filed: Jul. 15, 2003

(65) Prior Publication Data

US 2004/0079609 A1 Apr. 29, 2004

(30) Foreign Application Priority Data

Jul. 15, 2002 (JP) .................................. 2002-206089

(51) Int. Cl.[7] .......................... F16D 11/14; F16H 55/17
(52) U.S. Cl. ........................... 192/108; 29/893; 74/431
(58) Field of Search .......................... 192/108, 114 T, 192/69, 69.7; 29/893, 893.1, 893.2, DIG. 48; 74/431, 439, 446, 432

(56) References Cited

U.S. PATENT DOCUMENTS

| | | | | |
|---|---|---|---|---|
| 3,461,738 A | * | 8/1969 | Pandjiris et al. | 74/446 |
| 3,626,779 A | * | 12/1971 | Howard | 74/431 |
| 3,678,557 A | | 7/1972 | Howard | |
| 4,070,920 A | * | 1/1978 | LeBlanc | 74/446 |
| 4,118,848 A | * | 10/1978 | Goldschmidt et al. | 29/893.2 |
| 4,938,089 A | * | 7/1990 | Ohoka | 192/108 |

FOREIGN PATENT DOCUMENTS

| | | | | |
|---|---|---|---|---|
| GB | 1 309 967 | | | 3/1973 |
| JP | 63-120958 A | * | | 5/1988 |
| JP | 2-31060 A | * | | 2/1990 |
| JP | 3-153853 | | | 7/1991 |

* cited by examiner

*Primary Examiner*—Rodney H. Bonck
(74) *Attorney, Agent, or Firm*—Oblon, Spivak, McClelland, Maier & Neustadt, P.C.

(57) ABSTRACT

A transmission gear with a dog clutch gear in which the dog clutch gear has clutch teeth formed on an outer circumferential surface of a ring part and tapered inversely so that the tooth thickness of each tooth decreases gradually from a chamfer portion at a tip end toward a base end portion thereof, and the dog clutch gear is integrally fitted onto a boss portion of the transmission gear which portion is coaxially and integrally formed on a side surface of the transmission gear, characterized in that a flange is provided on the ring part to be located on the side corresponding to the base end portion of the clutch teeth, and plurality of surfaces between the ring part and the transmission gear is performed by welding.

18 Claims, 6 Drawing Sheets

(PRIOR ART)

TRANSMISSION GEAR WITH DOG CLUTCH GEAR AND METHOD FOR MANUFACTURING THE SAME

BACKGROUND OF THE INVENTION

1. Field of the Invention

The present invention relates to a transmission gear with a dog clutch gear which is to be incorporated into a manual transmission for vehicle use, and to a method of manufacturing a transmission gear with a dog clutch gear.

2. Description of the Related Art

A transmission gear with a dog clutch gear is configured in such a manner that the dog clutch gear is disposed coaxially with the transmission gear. In the past, there was widely used a single body type in which a dog clutch gear and a transmission gear are integrated and in which a tool relief groove which is necessary for cutting of the dog clutch gear is provided between the dog clutch gear and the transmission gear. However, with demand for downsizing, there has been adapted, as a mainstream configuration, a configuration such that no tool relief groove is provided, and the dog clutch gear and the transmission gear are in close contact with each other (hereinafter referred to as a groove-less type). For such a groove-less type, there have been used an integral forging method, and a method in which a dog clutch gear and a transmission gear, formed through forging or cutting, are united together (hereinafter referred to as a combining scheme).

Since the former integral forging method requires an advanced technique, only a few companies, including the applicant of the present application, have succeeded in putting the method to practical use. Therefore, there is no guarantee that the method can be used for manufacture of products even when excellent facilities are provided. Further, as compared with the combining scheme, the integral forging method may involve disadvantages in relation to manufacture of products, depending on product shape. Therefore, the latter combining scheme has still been employed.

Figure 9A:
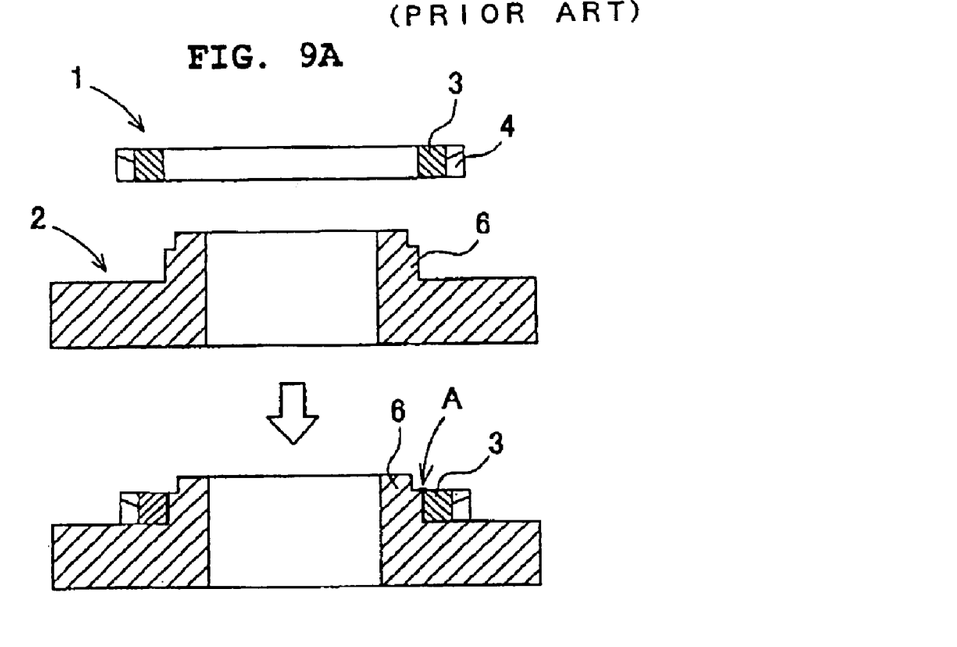
FIGS. 9A and 9B are explanatory views illustrating prior example.
Figure 9B:
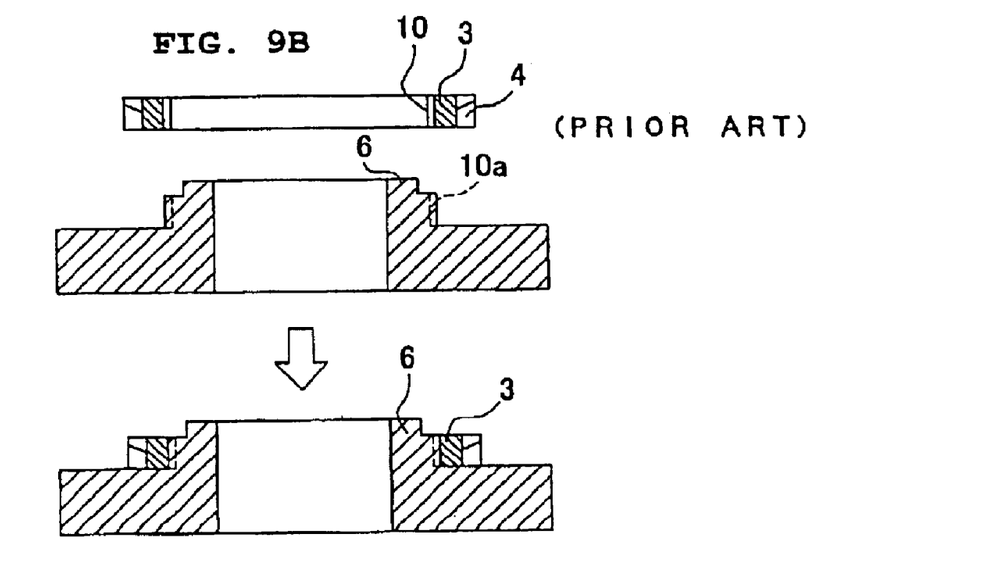

In the combining scheme having been employed heretofore, as shown in FIG. 9A, a ring portion 3 of a dog clutch gear 1, which is fitted onto a boss portion 6 of a transmission gear 2, is welded to the boss portion 6 at an interface A between the ring portion 3 and the boss portion 6; or as shown in FIG. 9B, the ring portion 3 and the boss portion 6 are joined together by use of an inner spline 10 formed on the ring portion 3, and an outer spline 10a formed on the boss portion 6.

Figure 10:
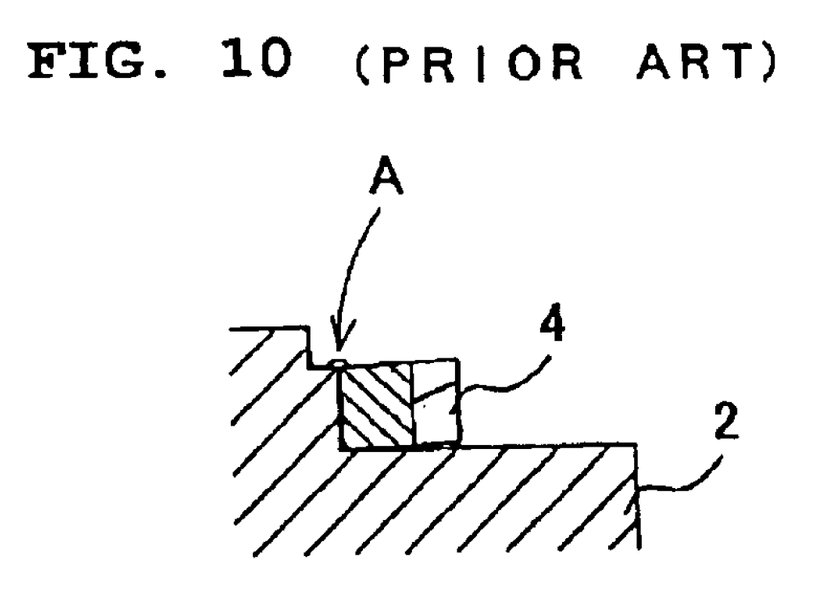
FIG. 10 is an illustrative view illustrating disadvantages of the prior example.

In the welding type of the conventional combining scheme, since welding can be performed only at a single point; i.e., at the interface A between the ring portion 3 and the boss portion 6, as shown in FIG. 10, base end portions of clutch teeth 4 in close contact with a side surface of the transmission gear 2 are distorted in a warped shape by influence of welding heat, with the result that the base end portions lift from the side surface of the transmission gear.

Further, joining by means of welding tends to cause problems, such as deflection of the center and deterioration of accuracy, which are caused by deformation of the clutch teeth attributed to influence of welding heat. The type in which joining is performed by means of splines involves problems in that forming splines requires a special machining facility, and cost increases due to tool cost. Further, since the clutch teeth 4 are formed integrally with the ring portion 3 on a tooth-by-tooth basis, the element involves a concern about strength.

SUMMARY OF THE INVENTION

It is a primary object to provide a transmission gear with a dog clutch gear by a combining scheme in order to secure sufficient strength.

It is another object to provide a transmission gear with a dog clutch gear in which the dog clutch gear has clutch teeth formed on an outer circumferential surface of a ring part and tapered inversely so that the tooth thickness of each tooth decreases gradually from a chamfer portion at a tip end toward a base end portion thereof, and the dog clutch gear is fitted onto a boss portion of the transmission gear which portion is coaxially and integrally formed on a side surface of the transmission gear, in which a flange is provided on the ring part to be located on the side corresponding to the base end portion of the clutch teeth, and plurality of interfaces between the ring part and the transmission gear is performed by welding.

It is a further object to provide a transmission gear with a dog clutch gear, in which the plurality of surfaces between the ring part and the transmission gear are simultaneously welded.

It is a still further object to provide a transmission gear with a dog clutch gear in which the dog clutch gear has clutch teeth formed on an outer circumferential surface of a ring part and tapered inversely so that the tooth thickness of each tooth decrease gradually from a chamfer portion at a tip end toward a base end portion thereof, and the dog clutch gear is fitted onto a boss portion of the transmission gear which portion is coaxially and integrally formed on a side surface of the transmission gear, in which a flange is provided on the ring part to be located on the side corresponding to the base end portion of the clutch teeth, and welding a first interface between an inner circumferential surface of the ring part and an outer circumferential surface of the boss portion and a second interface between a surface of the flange and the side surface of the transmission gear are performed by welding.

It is a yet further object to provide a transmission gear with a dog clutch gear, in which the first and second interfaces are simultaneously performed by welding.

It is a yet further object to provide a transmission gear with a dog clutch gear, in which the outer diameter of the flange is rendered equal to the maximum diameter of the clutch teeth.

It is another object to provide a transmission gear with a dog clutch gear, in which the outer diameter of the flange is rendered greater than the maximum diameter of the clutch teeth.

It is a further object to provide a transmission gear with a dog clutch gear, in which an annular groove whose inner wall surface is continuous with an outer circumferential surface of the boss portion and whose outer wall surface has the diameter equal to the outer diameter of the flange is formed on the side surface of the transmission gear.

It is a still further object to provide a transmission gear with a dog clutch gear, in which an annular groove whose inner wall surface is continuous with an outer circumferential surface of the boss portion and whose outer wall surface has the diameter greater than the outer diameter of the flange is formed on the side surface of the transmission gear.

It is a yet further object to provide a method of manufacturing a transmission gear with a dog clutch gear which comprises separately forming a dog clutch gear and a transmission gear, in which the dog clutch gear has clutch teeth formed on an outer circumferential surface of a ring part and tapered inversely so that the tooth thickness of each tooth decreases gradually from a chamfer portion at a tip end toward a base end portion thereof, a flange is provided on the ring part to be located on the side corresponding to the base end portion of the clutch teeth, and the transmission gear has a boss portion which is coaxially and integrally formed on a side surface of the transmission gear; fitting the dog clutch gear onto the boss portion of the transmission gear; and simultaneously performing welding between the ring part and the boss portion and welding between the flange and the side surface of the transmission gear.

It is a yet further object to provide a transmission gear with a dog clutch gear in which a dog clutch gear and a transmission gear are formed separately, wherein the dog clutch gear has clutch teeth formed on an outer circumferential surface of a ring part and tapered inversely so that the tooth thickness of each tooth decreases gradually from a chamfer portion at a tip end toward a base end portion thereof, a flange is provided on the ring part to be located on the side corresponding to the base end portion of the clutch teeth, and the transmission gear has an axial hole that matches the flange; the transmission gear is fitted onto the flange of the dog clutch gear; and welding between the transmission gear and the flange is performed on both side surfaces of the transmission gear.

It is another object to provide a method of manufacturing a transmission gear with a dog clutch gear which comprises separately forming a dog clutch gear and a transmission gear, wherein the dog clutch gear has clutch teeth formed on an outer circumferential surface of a ring part and tapered inversely so that the tooth thickness of each tooth decreases gradually from a chamfer portion at a tip end toward a base end portion thereof, a flange is provided on the ring part to be located on the side corresponding to the base end portion of the clutch teeth, and the transmission gear has an axial hole that matches the flange; fitting the transmission gear onto the flange of the dog clutch gear; and performing welding between the transmission gear and the flange on both side surfaces of the transmission gear simultaneously.

According to the present invention, the strength of clutch teeth increases by virtue of formation of a flange, and the flange serves as a heat radiation plate.

Therefore, the clutch teeth become less likely to deform under the influence of heat generated during welding. Further, since the dog clutch gear is joined to the transmission gear at the inner and outer circumferences or at opposite ends of the outer circumference on the front and back surfaces, the outer circumferential portion of the dog clutch gear does not lift from warpage caused by welding heat, whereby a high degree of joint comparable to that of an integrally formed product can be secured.

Further, when the outer diameter of the flange is made greater than the maximum diameter of the clutch teeth, the heat radiation effect can be further enhanced, so that influence of welding heat generated upon joining the transmission gear and the flange can be minimized. In addition, when the flange is sunk, the size can be reduced.

Moreover, in the type in which a transmission gear is fitted onto a flange of a dog clutch gear for integration, since the flange has an increased thickness, the strength of clutch teeth is increased, and influence of welding heat hardly occurs.

DETAILED DESCRIPTION OF THE PREFERRED EMBODIMENTS

A transmission gear with a dog clutch gear according to the present invention and a method of manufacturing the same will be described with reference to the drawings.

Figure 1:
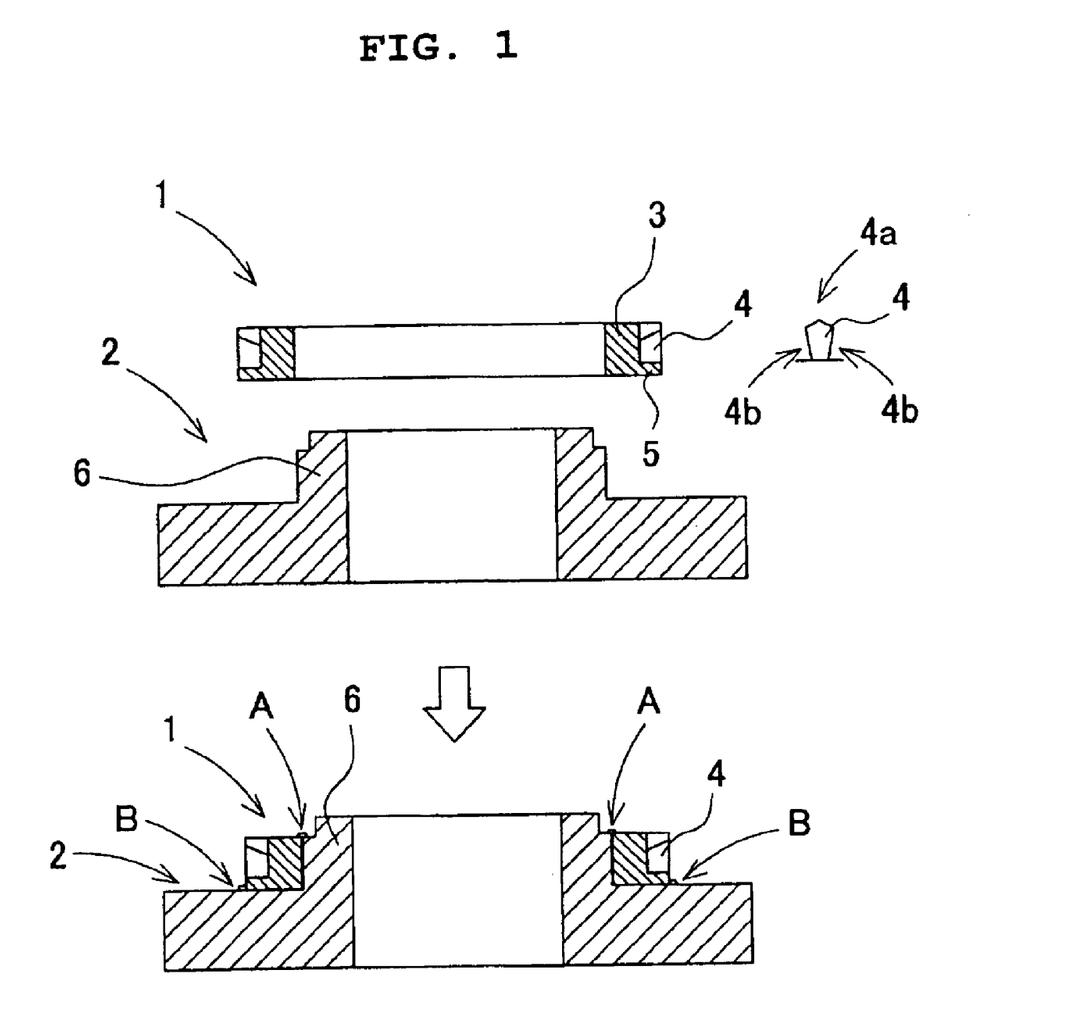
FIG. 1 is an explanatory view illustrating a method for manufacturing a transmission gear with a dog clutch gear according to the present invention.

In FIG. 1, reference numeral 1 denotes a dog clutch gear, and 2 denotes a transmission gear. The dog clutch gear 1 has clutch teeth 4 formed on an outer circumferential surface of a ring part 3. Inverted tapers 4b are imparted to each of the clutch teeth 4, so that the tooth thickness of each tooth decreases gradually from a chamfer portion 4a at the tip end toward a base end portion thereof. A flange 5 having an outer diameter equal to a maximum diameter of the clutch teeth 4 is formed integrally with the ring part 3 to be located on the side corresponding to the base end portion of the clutch teeth 4.

A boss portion 6 projects from one side surface of the transmission gear 2; and an outer circumferential surface of the transmission gear 2 is reserved for formation of helical teeth.

The dog clutch gear 1 is fitted onto the boss portion 6 of the transmission gear 2. Subsequently, welding is performed simultaneously at an interface A between the ring portion 3 and the boss portion 6 and at an interface B between the flange 5 and the transmission gear 2. After joining, a helical gear is formed on the outer periphery of the transmission gear.

In the transmission gear with a dog clutch gear fabricated as described above, lifting of the dog clutch gear 1 is prevented, and therefore upward warpage of the clutch gear does not occur.

Since the clutch teeth are connected with one another by means of the flange, the strength of the teeth increases. Further, since the flange serves as a heat radiation plate, the clutch teeth are unlikely to be influenced by welding heat.

Figure 2:
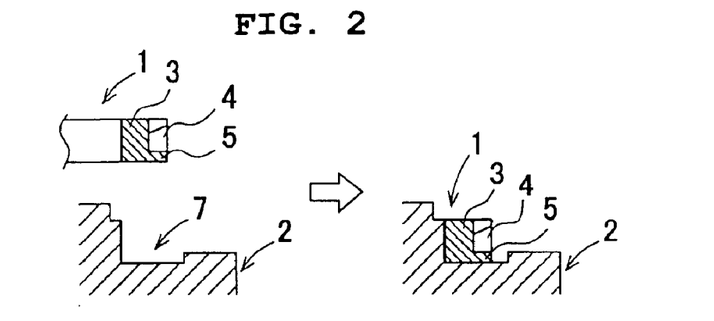
FIG. 2 is an explanatory view explaining a modified example in the present invention.

The transmission gear with a dog clutch gear according to the above-described embodiment is configured in such a manner that the flange projects stepwise from a side surface of the transmission gear. However, the transmission gear with a dog clutch gear may assume a configuration shown in FIG. 2 or a configuration shown in FIG. 3. In the configuration shown in FIG. 2, an annular groove 7 whose inner wall surface is continuous with the outer circumferential surface of the boss portion 6 and whose outer wall surface has a diameter greater than that of the flange 5 is formed on the side surface of the transmission gear 2, and the flange 5 is fitted into the annular groove 7, whereby the clutch teeth 4 extend upward from the level of the side surface of the transmission gear 2. In the configuration shown in FIG. 3, the depth of the annular groove 7 is rendered greater than the thickness of the flange 5 in order to sink the flange 5 into the annular groove 7, whereby the clutch teeth 4 extend upward from the position lower than the side surface of the transmission gear 2.

Figure 3:
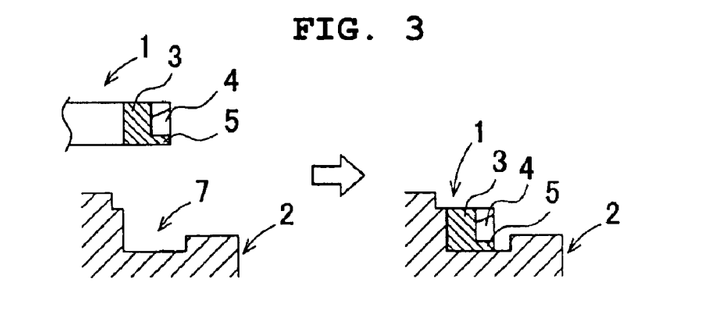
FIG. 3 is an explanatory view illustrating modifications in the present invention.
Figure 4:
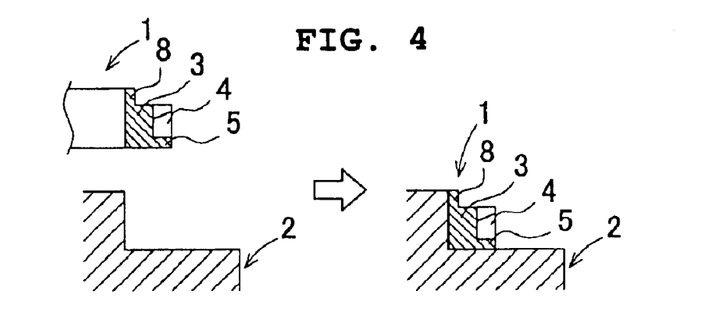
FIG. 4 is an explanatory view illustrating modifications in the present invention.
Figure 5:
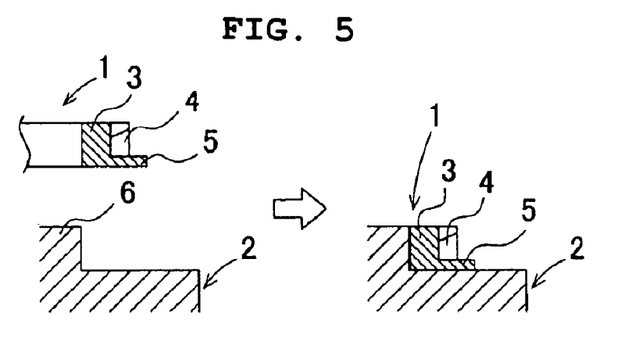
FIG. 5 is an explanatory view illustrating modifications in the present invention.
Figure 6:
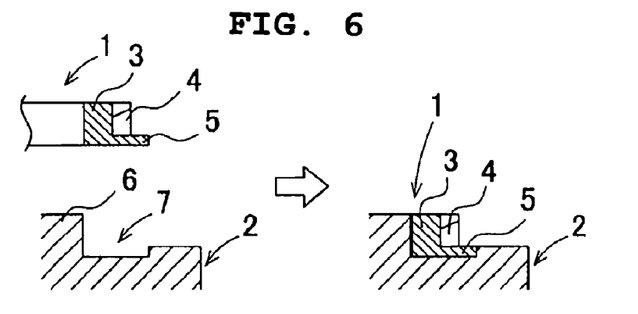
FIG. 6 is an explanatory view illustrating modifications in the present invention.
Figure 7:
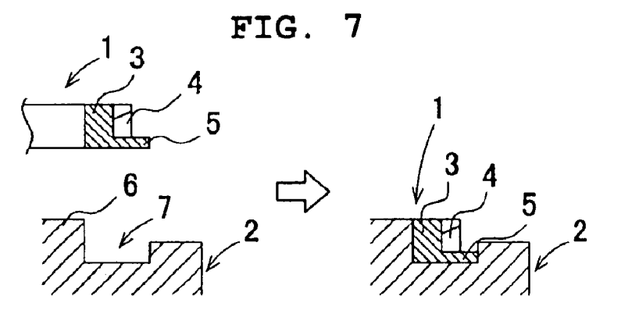
FIG. 7 is an explanatory view illustrating modifications in the present invention.

Further, the design of the transmission gear with a dog clutch gear may be modified in a manner shown in FIG. 4; i.e., such that a cone portion 8 is provided to extend from an end of the ring part 3, which end corresponds to the tip ends of the clutch teeth 4, or in a manner shown in FIG. 5; i.e., such that the outer diameter of the flange 5 is made greater than the large diameter of the clutch teeth 4. Further, there may be employed a configuration shown in FIG. 6 in which an annular groove 7 for receiving the flange 5 having a diameter greater than the large diameter of the clutch teeth 4 is provided on the side surface of the transmission gear 2; or a configuration shown in FIG. 7 in which the clutch teeth 4 extend upward from the position lower than the side surface of the transmission gear 2 as in the case shown in FIG. 3.

In each of the above-described embodiments, the dog clutch gear is fitted onto the boss portion, which is integrally formed on one side surface of the transmission gear in a coaxial relation to thereby be united with the transmission gear. However, a transmission gear may be fitted onto a flange of a dog clutch gear to be united therewith.

Figure 8A:
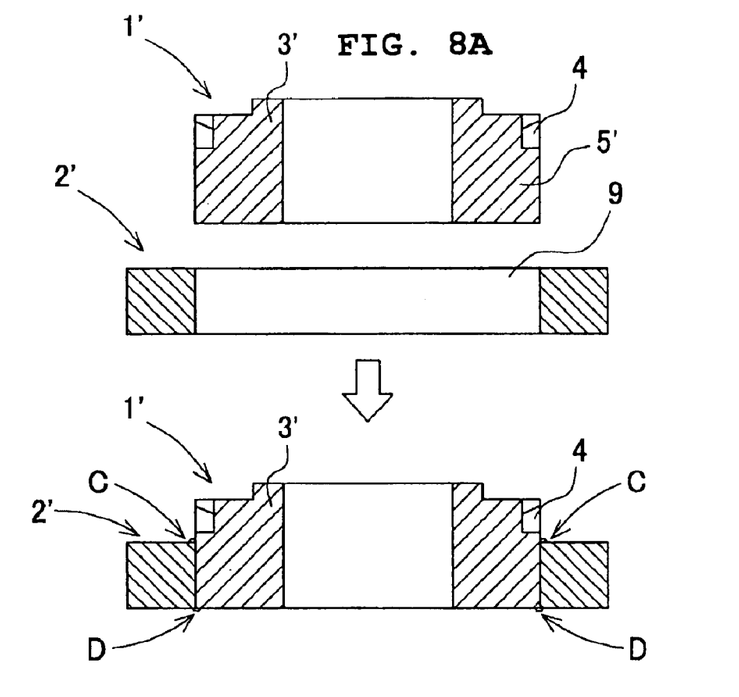
FIGS. 8A and 8B are explanatory views illustrating modifications in the present invention.
Figure 8B:
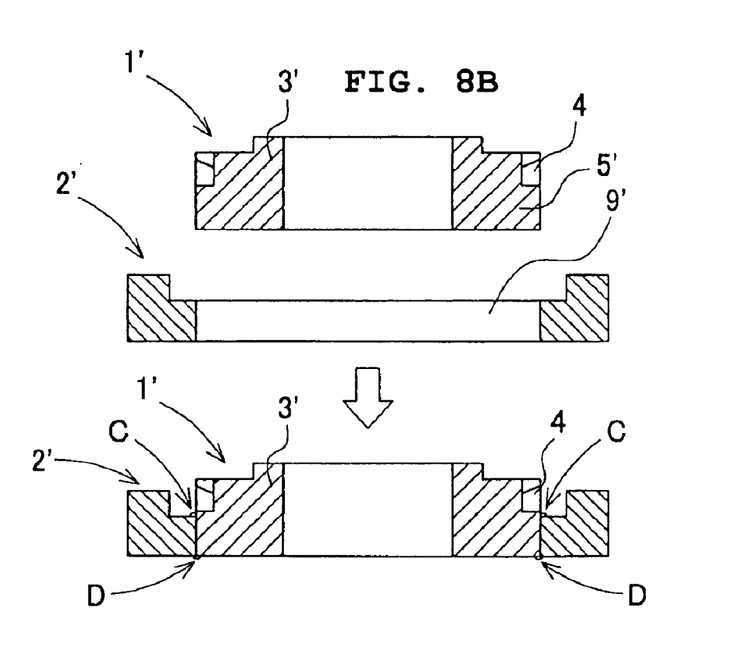

Next, such a modified embodiment will be described. As shown in FIG. 8, a dog clutch gear 1' has clutch teeth 4 formed on an outer circumferential surface of a ring portion 3'. Inverted tapers are imparted to each of the clutch teeth 4, so that the tooth thickness of each tooth decreases gradually from a chamfer portion at the tip end toward a base end portion thereof. A thick flange 5' is formed integrally with the ring portion 3' to be located on the side corresponding to the base end portion of the clutch teeth 4.

Meanwhile, a transmission gear 2' has an axial hole 9 which matches the flange 5' of the dog clutch gear 1'. The dog clutch gear 1' and the transmission gear 2' are formed separately.

The transmission gear 2' is fitted onto the flange 5' of the dog clutch gear 1', and welding is performed at opposite ends C and D of the interface between the transmission gear 2' and the flange 5' on both side surfaces thereof. This modified embodiment is expected to achieve the same effects as those achieved by the above-described embodiment.

The type shown in FIG. 8A corresponds to the type shown in FIG. 1 in the above-described embodiment, whereas the type shown in FIG. 8B corresponds to the type shown in FIG. 3 in the above-described embodiment. Products having shapes corresponding to different types can be obtained through adjustment of the thickness of the flange and formation of a stepped axial hole 9'.

When a cone is formed on the dog clutch gear or the diameter of the flange is increased as in the embodiments shown above, the welding portions are separated from the clutch teeth, and the heat radiation effect is enhanced. Therefore, center deflection or accuracy deterioration becomes less likely to occur.

Further, the configuration such that the clutch teeth extend upward from the position lower than the side surface of the transmission gear enables downsizing. Notably, in the above-described embodiments, helical teeth are not formed on the outer periphery of the transmission gear before the joining operation. However, in some cases, helical teeth are formed before the joining operation.

Formation of the dog clutch gear and the transmission gear, which are to be fabricated separately, may be performed through forging or cutting.

The preferred embodiments of the present invention, as herein disclosed are taken as some embodiments for explaining the present invention. It is to be understood that the present invention should not be restricted by these embodiments and any modifications and additions are possible so far as they are not beyond the technical idea or principle based on descriptions of the scope of the patent claims.

What is claimed is:

1. A transmission gear with a dog clutch gear in which the dog clutch gear has clutch teeth formed on an outer circumferential surface of a ring part and tapered inversely so that the tooth thickness of each tooth decreases gradually from a chamfer portion at a tip end toward a base end portion thereof, and the dog clutch gear is fitted onto a boss portion of said transmission gear, said boss portion coaxially and integrally formed on a side surface of said transmission gear, comprising:

a flange on an outer circumferential surface of said ring part extending in an outer radial direction from said base end portion of the clutch teeth; and a plurality of interfaces between said ring part and said transmission gear.

2. A transmission gear with a dog clutch gear according to claim 1, wherein said plurality of interfaces between said ring part and said transmission gear are welds.

3. A transmission gear with a dog clutch gear in which the dog clutch gear has clutch teeth formed on an outer circumferential surface of a ring part and tapered inversely so that the tooth thickness of each tooth decrease gradually from a chamfer portion at a tip end toward a base end portion thereof, and the dog clutch gear is fitted onto a boss portion of said transmission gear, said boss portion coaxially and integrally formed on a side surface of said transmission gear, comprising:

a flange on an outer circumferential surface of said ring part extending in an outer radial direction from said base end portion of the clutch teeth; and a first interface between an inner circumferential surface of said ring part and an outer circumferential surface of said boss portion and a second interface between a surface of said flange and the side surface of the transmission gear.

4. A transmission gear with a dog clutch gear according to claim 3, wherein said first and second interfaces are welds.

5. A transmission gear with a dog clutch gear according to claim 4, wherein an outer diameter of said flange is equal to a maximum diameter of said clutch teeth.

6. A transmission gear with a dog clutch gear in which the dog clutch gear has clutch teeth formed on an outer circumferential surface of a ring part and tapered inversely so that the tooth thickness of each tooth decrease gradually from a chamfer portion at a tin end toward a base end portion thereof, and the dog clutch gear is fitted onto a boss portion of said transmission gear, said boss portion coaxially and integrally formed on a side surface of said transmission gear, comprising:

a flange on said ring part to be located on the side corresponding to the base end portion of the clutch teeth, an outer diameter of said flange greater than a maximum diameter of said clutch teeth; and a first interface between an inner circumferential surface of said ring part and an outer circumferential surface of said boss portion and a second interface between a surface of said flange and the side surface of the transmission gear.

7. A transmission gear with a dog clutch gear according to claim 6, further comprising:

an annular groove, whose inner wall surface is continuous with an outer circumferential surface of said boss portion and whose outer wall surface has a diameter equal to the outer diameter of the flange, formed in the side surface of said transmission gear.

8. A transmission gear with a dog clutch gear according to claim 6, further comprising:

an annular groove, whose inner wall surface is continuous with an outer circumferential surface of said boss portion and whose outer wall surface has a diameter greater than the outer diameter of the flange, formed in the side surface of said transmission gear.

9. A transmission gear with a dog clutch gear in which the dog clutch gear has clutch teeth formed on an outer circumferential surface of a ring part and tapered inversely so that the tooth thickness of each tooth decrease gradually from a chamfer portion at a tip end toward a base end portion thereof, and the dog clutch gear is fitted onto a boss portion of said transmission gear, said boss portion coaxially and integrally formed on a side surface of said transmission gear, comprising:

a flange on said ring part to be located on the side corresponding to the base end portion of the clutch teeth, an outer diameter of said flange equal to a maximum diameter of said clutch teeth;

a first interface between an inner circumferential surface of said ring part and an outer circumferential surface of said boss portion and a second interface between a surface of said flange and the side surface of the transmission gear; and an annular groove, whose inner wall surface is continuous with an outer circumferential surface of said boss portion and whose outer wall surface has a diameter equal to the outer diameter of the flange, formed in the side surface of said transmission gear.

10. A transmission gear with a dog clutch gear in which the dog clutch gear has clutch teeth formed on an outer circumferential surface of a ring part and tapered inversely so that the tooth thickness of each tooth decrease gradually from a chamfer portion at a tip end toward a base end portion thereof, and the dog clutch gear is fitted onto a boss portion of said transmission gear, said boss portion coaxially and integrally formed on a side surface of said transmission gear, comprising:

a flange on said ring part to be located on the side corresponding to the base end portion of the clutch teeth, an outer diameter of said flange equal to a maximum diameter of said clutch teeth;

a first interface between an inner circumferential surface of said ring part and an outer circumferential surface of said boss portion and a second interface between a surface of said flange and the side surface of the transmission gear; and an annular groove, whose inner wall surface is continuous with an outer circumferential surface of said boss portion and whose outer wall surface has a diameter greater than the outer diameter of the flange, formed in the side surface of said transmission gear.

11. A method of manufacturing a transmission gear with a dog clutch gear comprising:

separately forming a dog clutch gear and a transmission gear, said dog clutch gear having clutch teeth formed on an outer circumferential surface of a ring part and tapered inversely so that the tooth thickness of each tooth decreases gradually from a chamfer portion at a tip end toward a base end portion thereof, said dog clutch gear including a flange on an outer circumferential surface of said ring part extending in an outer radial direction from said base end portion of the clutch teeth, and said transmission gear having a boss portion coaxially and integrally formed on a side surface of said transmission gear;

fitting said dog clutch gear onto said boss portion of said transmission gear; and providing a plurality of interfaces between said ring part and said boss portion and welding between said flange and the side surface of said transmission gear.

12. A method of manufacturing a transmission gear with a dog clutch gear according to claim 11, wherein said plurality of interfaces between said ring part and said transmission gear are welds.

13. A method of manufacturing a transmission gear with a dog clutch gear according to claim 11, wherein said plurality of interfaces between said ring part and said transmission gear are simultaneously welded.

14. A transmission gear with a dog clutch gear, comprising:

clutch teeth formed on an outer circumferential surface of a ring part of said dog clutch gear, said clutch teeth tapered inversely so that the tooth thickness of each tooth decreases gradually from a chamfer portion at a tip end toward a base end portion thereof; and a flange on an outer circumferential surface of said ring part extending in an outer radial direction from said base end portion of the clutch teeth, wherein said transmission gear and said dog clutch gear are formed separately, said transmission gear has an axial hole with a diameter that matches a diameter of said flange, the transmission gear is configured to fit onto said flange of said dog clutch gear, and the transmission gear and the flange are configured to be fixed to each other on both side surfaces of said transmission gear.

15. A transmission gear with a dog clutch gear according to claim 14, wherein said plurality of interfaces between said ring part and said transmission gear are welds.

16. A method of manufacturing a transmission gear with a dog clutch gear comprising:

separately forming a dog clutch gear and a transmission gear, said dog clutch gear having clutch teeth formed on an outer circumferential surface of a ring part and tapered inversely so that the tooth thickness of each tooth decreases gradually from a chamfer portion at a tip end toward a base end portion thereof, said dog clutch sear including a flange on an outer circumferential surface of said ring part extending in an outer radial direction from said base end portion of the clutch teeth, and said transmission gear having an axial hole with a diameter that matches a diameter of said flange;

fitting the transmission gear onto said flange of said dog clutch gear; and providing a plurality of interfaces between said transmission gear and the flange on both side surfaces of said transmission gear.

17. A method of manufacturing a transmission gear with a dog clutch gear according to claim 16, wherein said plurality of interfaces between said ring part and said transmission gear are welds.

18. A method of manufacturing a transmission gear with a dog clutch gear according to claim 16, wherein said plurality of interfaces between said ring part and said transmission gear are simultaneously welded.

* * * * *

UNITED STATES PATENT AND TRADEMARK OFFICE
CERTIFICATE OF CORRECTION

PATENT NO. : 6,905,011 B2  
APPLICATION NO. : 10/618611  
DATED : June 14, 2005  
INVENTOR(S) : Junichi Ooka Page 1 of 1

It is certified that error appears in the above-identified patent and that said Letters Patent is hereby corrected as shown below:

Column 6, line 53, change "tin" to --tip--.

Signed and Sealed this

Twelfth Day of September, 2006

JON W. DUDAS  
*Director of the United States Patent and Trademark Office*